No. 792,497. PATENTED JUNE 13, 1905.
T. CANFIELD.
ROPE SOCKET.
APPLICATION FILED MAR. 10, 1905.
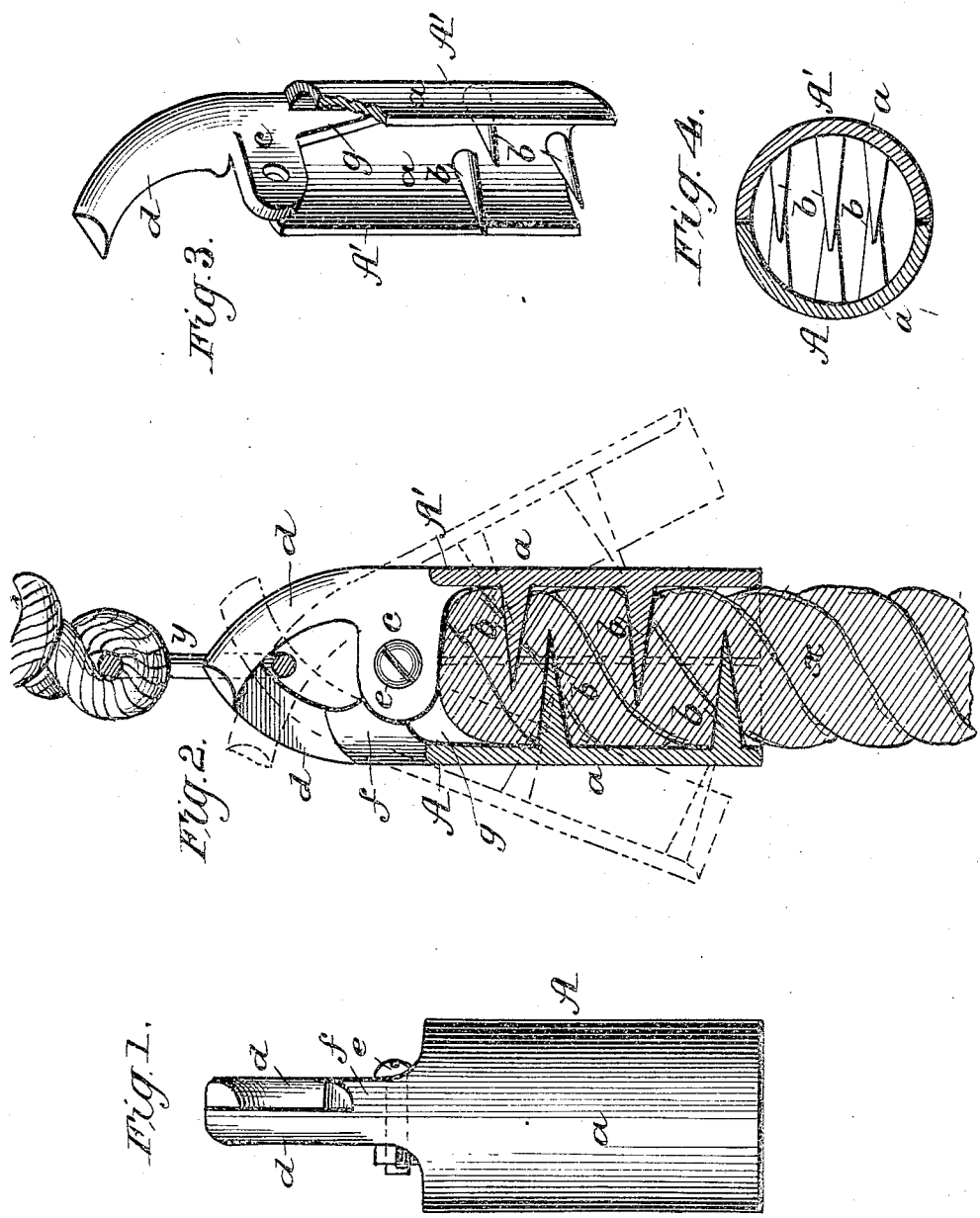
WITNESSES:
Jos. A. Ryan.
Amos W Hart
INVENTOR
Thomas Canfield
BY Munn & Co.
ATTORNEYS No. 792,497. Patented June 13, 1905.

UNITED STATES PATENT OFFICE.

THOMAS CANFIELD, OF POTTSVILLE, PENNSYLVANIA.

ROPE-SOCKET.

SPECIFICATION forming part of Letters Patent No. 792,497, dated June 13, 1905.

Application filed March 10, 1905. Serial No. 249,395.

*To all whom it may concern:*

Be it known that I, THOMAS CANFIELD, a citizen of the United States, residing at Pottsville, in the county of Schuylkill and State of Pennsylvania, have made certain new and useful Improvements in Rope-Sockets, of which the following is a specification.

My invention is an improvement in that class of rope-sockets which are provided with jaws adapted to embrace and hold the end of a rope.

The object of my invention is to provide a socket which shall be distinguished by lightness, cheapness, strength, and security of hold upon a rope and which may be easily applied to and detached from a rope end and any suspending device.

The details of construction, arrangement, and combination of parts are as hereinafter described, reference being had to the accompanying drawings, in which—

Figure 1 is a side view of my improved rope-socket. Fig. 2 is a longitudinal section of the same. Fig. 3 is a perspective view of one of the two duplicate members of the socket, a portion being broken away; and Fig. 4 is a transverse section of the socket.

The socket is composed of two duplicate members A A', each formed of a semicylindrical jaw $a$, having staggered teeth $b$, an inwardly-projecting lug $c$, and a hook or curved prong $d$, the bases of the said lug and prong being extended and reinforced laterally and longitudinally, as hereinafter described, for the purpose of securing maximum strength and lightness. The lugs $c$ project inwardly and lap upon each other and are pivoted together by means of a detachable screw-bolt $e$. When the jaws are open, as shown by dotted lines, Fig. 2, a rope end $x$ is inserted, and when the jaws are closed upon the rope, as shown by full lines, the teeth $b$ pierce the rope at different points, and thus hold the same with great security. Owing to the staggered arrangement of the teeth in each jaw and in the two jaws relative to each other, each tooth has a hold independent of every other. When the jaws are closed as stated, they form a cylindrical socket which fully incloses and protects as well as holds the rope end securely. As will be apparent by inspection of Figs. 1 and 3, the lug $c$ and prong $d$ of each member A are arranged eccentric to the jaw $a$ thereof, and the outer portions of the prongs are flattened on their inner sides and lie in contact, as indicated. At the base of each lug and prong there is a lateral reinforce $f$, which extends down to and joins the adjacent end of the jaw $a$, and, as shown in Figs. 2 and 3, the base of the lug is extended longitudinally at $g$ on the interior of the jaw, whereby the connection and intersupport of the two parts is strengthened. By this construction and arrangement of parts I strengthen the rope-socket at a point where others have usually been weak, and hence defective, and at the same time this result is attained without appreciable increase in the size and weight of the socket as a whole. As shown in Fig. 2, the end of each lug $c$ lies when the jaws $a$ are closed in close proximity to or in contact with the inner curved side of the lateral reinforce $f$.

It will be further seen that the head and nut of the bolt $e$ lie wholly within the circumference of the cylindrical portion of the socket, and hence do not come in contact with the pulleys or drums over which the socket may pass when in use as a means for connecting the ends of a rope used as belting. For the same reason also the contact of the bolt and nut with other objects is ordinarily avoided.

It will be further seen that the outer side of the prongs and the reinforce $f$ thereof form a smooth symmetrical continuation of the outer side of the jaw, with which they are constructed integrally, so that while great strength is obtained at that point the socket presents exteriorly a smooth surface having no eccentric projection.

In order to attach the socket to a ring or other member forming part of a connecting or suspending means, it is obvious that the two members A A' must be detached from each other, which is effected by removing the bolt and nut, and that when applied, say to a ring $y$, as shown in Fig. 2, the ring will be securely attached, and when traction is applied thereto the hooks or prongs $d$ are pressed outward, which throws the jaws $a$ inward or toward each other and holds them securely in that position.

Having thus described my invention, what I claim as new, and desire to secure by Letters Patent, is—

1. The improved rope-socket comprising two duplicate integral members, each consisting of a semicylindrical jaw having staggered teeth arranged interiorly, a lug extending inwardly at right angles to the jaw, and an inwardly-curved terminal prong, the said lug and prong being arranged in alinement but eccentric to the jaw, and having lateral and longitudinal extensions and reinforced, and the prongs having their inner sides flattened, and a detachable pivot passing through the two overlapped lugs, as shown and described.

2. The improved rope-socket, comprising two duplicate integral members each formed of a semicylindrical jaw having interior teeth for piercing and holding a rope end, an inwardly-projecting lug and a terminal hook, or curved prong, which is in alinement with the lug, the base of the latter being extended at $g$ on the inner side of the jaw, the exterior being smooth and in the same plane with the outer side of the jaw, and a removable pivot-bolt passing through the overlapped lugs and the same lying within the circumference of the jaws, substantially as described.

THOMAS CANFIELD.

Witnesses:
JAMES J. MORAN,
M. J. FLEMING.